Jan. 31, 1967    E. W. CLINE    3,301,285
DRAG SAW
Filed Dec. 21, 1964
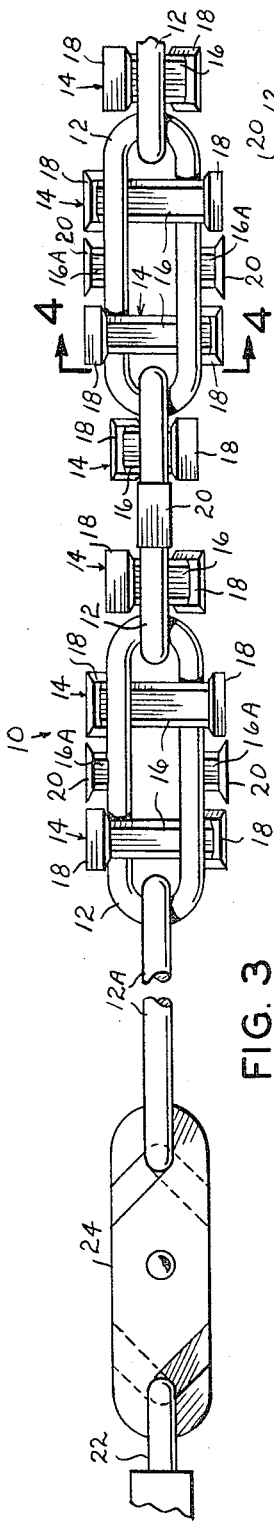
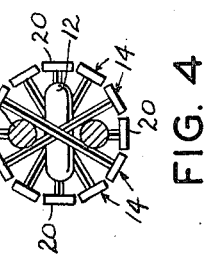
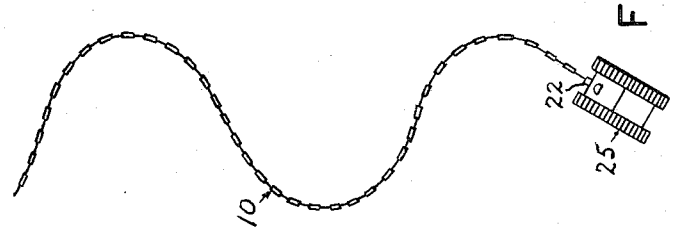
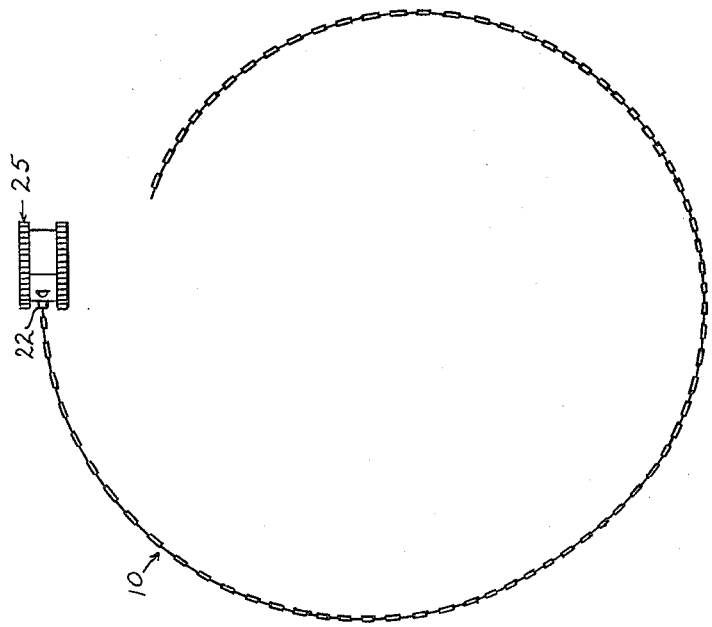
EUGENE W. CLINE
INVENTOR.
BY
*Robert K. Rhea*
AGENT

United States Patent Office 3,301,285
Patented Jan. 31, 1967

3,301,285
DRAG SAW
Eugene W. Cline, Box 111, Luther, Okla. 73054
Filed Dec. 21, 1964, Ser. No. 419,697
5 Claims. (Cl. 144—34)

The present invention relates to saws and more particularly to a device for clearing land of trees or underbrush and the like.

The principal object of the present invention is to provide an elongated flexible element having outwardly projecting blades or teeth for forming a saw tooth cutting action on trees or underbrush when the device is moved longitudinally, in an encircling action, around the base portion of trees or underbrush.

A similarly important object is to provide a saw-like flexible element which, when drawn over the surface to be cleared, will evenly and thoroughly cut and lay vegetation.

Another object is to provide a device which has no moving parts and is formed with cutting blades thereon so that the device may be attached to a prime mover and pulled from either end to perform the cutting action.

Another object is to provide a device of this character wherein the attached teeth or cutting blades substantially describe a circle when the device is viewed endwise.

A further object is to provide a device which is rugged in construction and wherein all parts are permanently joined together.

The present invention accomplishes these and other objects by forming a chain of interconnected open loops wherein each loop is provided with rigidly connected outwardly projecting cutting elements.

Other objects will be apparent from the following description when taken in conjunction with the accompanying single sheet of drawings, wherein:

FIGURE 1 is a top view of one manner in which the device is drawn over a field by a tractor;

FIGURE 2 is a view similar to FIG. 1 illustrating how the device is used to clear a path through underbrush and the like;

FIGURE 3 is a fragmentary side elevational view of the device to an enlarged scale; and, FIGURE 4 is a vertical cross-sectional view, partly in elevation, taken substantially along the line 4—4 of FIG. 3.

Like characters of reference designate like parts in those figures of the drawings in which they occur.

In the drawings:

The reference numeral 10 indicates the device, as a whole, which is formed of a plurality of interconnected closed loops or links 12 to form an elongated chain. The links 12 are preferably formed of one inch diameter rod-like material wherein each link lies in a single plane and is approximately twelve inches long. Each of the links 12 is provided with a pair of cutting elements 14 arranged in crossed relation when viewed from the end of the links. Each of the cutting elements 14 includes a rectangular shank 16 which extends diagonally through the link 12 adjacent its respective end portion and is secured, transversely of the shank, to the sides of the link in a rigid manner, as by welding. Each shank 16 projects outwardly beyond the limit of the respective side of the link and a rectangular blade 18 is centrally secured thereto normal to the longitudinal axis of the shank. Each of the blades 18 is under cut at its respective ends, to form oppositely directed sharpened end edges normal to the longitudinal axis of the respective link 12. Each longitudinal side edge of each shank 16 is beveled to form a coextensive sharpened edge. Each of the links 12 is further provided with a similar intermediate cutting blade 20 rigidly connected to the outwardly disposed surface of each side of the link, medially its ends, by a similar shank-like support 16A having opposing sharpened edge surfaces normal to the longitudinal axis of the respective link.

As shown in FIG. 4, the plane of each link 12 is normal to the plane of the preceding and succeeding link and the blades 18 and 20 on the respective links 12 substantially describe a circle when the device 10 is viewed in end elevation. A plurality of similar links, indicated at 12A, without the cutting blades, are connected to one end of the device 10 for connecting the latter to a tractor draw bar or the like 22 by a pair of pivotally joined connecting links 24.

Operation

In operation the connecting links 24 are secured to the draw bar 22 of a tractor, indicated at 25. The tractor is progressively moved in a circular direction, as shown by FIG. 1, wherein the device 10 performs a saw-like cutting action when drug along the surface of the earth against the base portion of tree trunks and other vegetation, such as underbrush, neither of which are shown. Alternatively the tractor 25 may be moved in a zig-zag or sine wave pattern, as shown by FIG. 2, so that the serpentine-like movement of the device 10 will clear a path through trees and underbrush. The length of the device may be varied as desired but is preferably of such length that when drawn around trees and underbrush, in the manner described, the vegetation will be severed and laid on the surface of the earth by the passage of the device.

Obviously the invention is susceptible to some change or alteration without defeating is practicability, and I therefore do not wish to be confined to the preferred embodiment shown in the drawings and described herein, further than I am limited by the scope of the appended claims.

I claim:

1. A drag saw, comprising: a plurality of interconnected closed loops forming an elongated chain; and a cutting element extending diagonally through and secured to each said loop, said cutting element comprising a shank portion having a sharpened edge and having its opposing end edges projecting outwardly beyond the limit of the respective said loop, and a blade secured to the respective end surface of said shank, said blade having a sharpened edge.

2. The combination with a chain formed by a plurality of interconnected closed links, of: a pair of cutting elements extending diagonally, in crossed relation, through and projecting beyond the outer limit of each said link, each said cutting element comprising a rectangular shank portion, having a sharpened longitudinal side edge, secured to each said link, and a rectangular blade secured to each end surface of said shank portion, said blade having a sharpened edge lying in a plane normal to the plane of the sharpened edge of said shank portion.

3. Structure as specified in claim 2 in which said cutting elements are disposed adjacent the respective end portion of each said link; and intermediate cutting elements secured to each said link between said pair of cutting elements, said intermediate cutting elements including a shank-like support extending outwardly from the outer limit of each said link, a rectangular blade secured to the outwardly disposed end edge of said shank-like support, said last mentioned blade having a sharpened edge lying in a plane normal to the plane of said shank-like support.

4. Structure as specified in claim 3 in which each said link lies in a single plane intersecting and normal to the plane of the adjacent connected link.

5. Structure as specified in claim 3 in which the blades on said pair of cutting elements and the blades of said intermediate cutting elements project outward equidistant to define a substantially cylindrical plane generated by the passage of the respective blades when said chain is moved longitudinally.

References Cited by the Examiner

UNITED STATES PATENTS

| 1,897,820 | 2/1933 | Pitchford | 56—8 |
| 1,954,905 | 4/1934 | Wheat | 143—133 |
| 2,751,736 | 6/1956 | Hessemer | 144—34 |
| 3,133,395 | 5/1964 | Farmer | 143—135 |

ANDREW R. JUHASZ, *Primary Examiner.*

WILLIAM W. DYER, JR., *Examiner.*

W. D. BRAY, *Assistant Examiner.*